Patented Oct. 13, 1942

2,298,291

UNITED STATES PATENT OFFICE 2,298,291

ALKYL CATECHOL

Walter H. Hartung, Baltimore, Md., assignor to Sharp & Dohme, Incorporated, Philadelphia, Pa., a corporation of Maryland No Drawing. Application June 15, 1935, Serial No. 26,776

6 Claims. (Cl. 260—625)

This invention relates to alkyl catechols. It includes the method of preparing alkyl catechols from guaiacol esters and from guaiacol and fatty acids, and the reduction of catechol alkyl ketones to alkyl catechols.

The alkyl catechols which have four, five, six and seven or more carbon atoms in the side chain and particularly hexyl catechol, have relatively high phenol coefficients. The invention includes the use of these alkyl catechols as antiseptics in pharmaceutical preparations and in antiseptic compositions containing one or more of the alkyl catechols which have a relatively high phenol coefficient.

Guaiacol esters of the fatty acids may easily be prepared. They form an inexpensive starting material for the preparation of the alkyl catechols, and by the method herein described good yields of the alkyl catechols are obtained from the guaiacol esters. The guaiacol esters are subjected to demethylation and rearrangement, e. g. by a process of simultaneous rearrangement and demethylation, to produce the catechol alkyl ketones. Also, the individual esters of catechol may be rearranged to give the catechol alkyl ketones, or such ketones may be prepared by the rearrangement of the mixed mono- and/or diesters of catechol. These ketones are then reduced to the corresponding alkyl catechols, e. g. by a process of catalytic reduction with hydrogen, or by reduction with zinc amalgam and hydrochloric acid.

The demethylation and rearrangement of the guaiacol esters to produce the catechol alkyl ketones is advantageously effected in the presence of alumina chloride. Although various inert organic solvents may be employed, carbon bisulfide is the solvent which has been found advantageous, and which I recommend. In carrying out the reaction, the temperatures must be kept comparatively low, and after removal of the solvent, the reaction mixture should preferably not be heated above 150° C., and preferably is heated around 130° and over a fairly long period of time. The process may be illustrated by the following examples; the parts being by weight:

Example 1.—Into a vessel provided with a stirrer and charging funnel and a reflux condenser, to the upper end of which an absorption apparatus for hydrogen chloride is attached, is placed a suspension of 70 parts of aluminum chloride in 195 parts by weight of carbon bisulfide. The suspension is stirred, and there is gradually added a solution of 45 parts of guaiacol propionate; 9.35 parts by weight of phosphorus oxychloride may be added simultaneously, but this is not necessary.

The reaction vessel is then heated gradually in an oil bath until its temperature reaches 90 to 95°. After refluxing and stirring for a short time, e. g. about ten minutes, the reflux condenser is replaced by a downward distilling condenser and the carbon bisulfide removed by distillation and is condensed. The temperature of the oil bath is then gradually elevated to 140° and maintained at this point for, e. g., about two hours.

The reaction mixture is now decomposed by the slow addition of dilute hydrochloric acid (1:1), and after the addition of the hydrochloric acid, heated for a short time, e. g. about 15 minutes, with the oil bath at about 130° C. The reaction products are then withdrawn, allowed to cool, and advantageously placed in a refrigerator overnight. The organic layer which separates is then removed, taken up in 160 parts of hot benzene, and the solution filtered and chilled, whereupon crystals of the ketone settle out. The time required will vary with the amount of material being treated. The crystals obtained are of good quality, and on recrystallization from water give a product of maximum melting point.

By substituting guaiacol esters of other acids for the propionate, it is possible to obtain other corresponding catechol ketones. The guaiacol esters may be prepared after the customary manner for ester preparation by allowing the guaiacol to react with an acid chloride, an acid anhydride or the acid itself in the presence of thionyl chloride.

The following illustrate some of the esters that can be used in the production of catechol alkyl ketones:

Guaiacol ester of propionic acid_____ 125–135° C. (8 mm.)
Guaiacol ester of butyric acid_____ 135–140° C. (7–10 mm.)
Guaiacol ester of valeric acid_____ Up to 180° C. (12 mm.)
Guaiacol ester of caproic acid_____ 160° C. (8–9 mm.)
Guaiacol ester of heptanoic acid_____ 160–165° C. (7 mm.)

Example 2.—22 parts of catechol are placed in a reaction vessel provided with a charging funnel and a reflux condenser to which an absorption apparatus for hydrogen chloride is attached. The catechol is heated to melting and 37 parts of propionyl chloride are then added slowly through the funnel. Gentle heating is continued until the evolution of hydrogen chloride has ceased, leaving a mixture of mono- and di-propionyl esters of catechol.

The product is allowed to cool to room temperature, dissolved in a solvent such as carbon bisulfide if necessary, and added slowly to a stirred suspension of 70 parts of anhydrous aluminum chloride in 195 parts of carbon bisulfide contained in a reaction vessel provided with stirrer, charging funnel and reflux condenser to which a hydrogen chloride absorption apparatus is attached. When the hydrogen chloride evolution has practically ceased, the reaction vessel is heated by an oil bath until the carbon bisulfide refluxes vigorously. The reflux condenser is then replaced by a downward distilling condenser, and the carbon bisulfide removed. After this, the temperature of the oil bath is raised rapidly to 135° C. and maintained at 135–140° C. for, e. g. about 5½ hours. The solid reaction product is then allowed to cool and is decomposed by the addition of dilute hydrochloric acid (1:1). A black oil is obtained which solidifies on cooling to a crystalline mass. This mass, on recrystallization, proves to be substantially pure propionyl catechol.

Instead of adding the catechol esters to a suspension of aluminum chloride in carbon bisulfide, the esters may be dissolved in carbon bisulfide, and the aluminum chloride added to this solution, advantageously in suspension in carbon bisulfide.

*Example 3.*—27.5 parts of catechol are placed in a reaction vessel equipped with charging funnel, a stirrer, and an absorption apparatus for hydrogen chloride, and warmed on an oil bath to about 120° C. 67.2 parts of caproyl chloride are then slowly added, e. g. over a period of about 40 minutes, with constant stirring. The temperature is maintained at about 120° C. until the evolution of hydrogen chloride ceases, e. g. about 20 minutes, when 27.5 additional parts of catechol are added. The product, consisting substantially of equi-molecular amounts of catechol and catechol di-caproate, is transferred to a charging funnel and slowly added, e. g. over a period of 30 minutes, to an agitated suspension of 200 parts of anhydrous aluminum chloride in 500 parts of carbon bisulfide, in a reaction vessel equipped with a stirrer, a charging funnel, and an hydrogen chloride absorption apparatus. The mixture is then heated on an oil bath for about an hour at 65–70° C. and the carbon bisulfide is then distilled off. The temperature is then raised to about 110° C. and held there for a considerable period, e. g. four hours. The reaction mixture is then allowed to cool, and is decomposed by the cautious addition of about 500 parts of dilute (1:1) hydrochloric acid. The mixture is transferred to another vessel and allowed to cool, whereupon the supernatant layer of dark organic material crystallizes. The crystals are crude caproyl catechol, which may be purified by distillation in vacuo, or by recrystallization from benzene, or by a combination of the two procedures.

By substituting for guaiacol propionate in Example 1 the appropriate guaiacol ester, or for the propionyl chloride of Example 2 or the caproyl chloride of Example 3 the appropriate acid chloride, and using the same molecular ratios as are used in these examples, other catchol alkyl ketones may be prepared, of which the following are typical:

|  | Melting point, ° C. |
|---|---|
| Catechol propyl ketone | 139 |
| Catechol butyl ketone | 97 |
| Catechol isobutyl ketone | 106–107 |
| Catechol amyl ketone | 93.8 |
| Catechol isoamyl ketone | 73.0–73.5 |
| Catechol hexyl ketone | 78–79 |
| Catechol heptyl ketone | 95.5–96.0 |

I do not claim the preparation of the alkyl catechol ketones as such, nor those of the alkyl catechol ketones which are new products, as these are described and claimed in Patent No. 2,078,205, granted April 20, 1937, to Ellis Miller and myself.

The alkyl catechols are prepared by the reduction of the catechol alkyl ketones. The reduction is exemplified by the following examples:

*Example 4.*—A mixture of 35 parts of hexanoyl catechol, 300 parts of water, a volume of concentrated hydrochloric acid equal to the volume of the water and 13 parts of amalgamated zinc is placed in a reaction vessel equipped with a stirrer and reflux condenser. The mixture is stirred and heated for about ten hours. After cooling, the supernatant organic layer is taken up in ether, dried over calcium chloride and distilled. The hexyl catechol obtained boils at 178–185° at 6 mm.

It was surprising to find that the catechol alkyl ketones could be reduced directly to alkyl catechols by hydrogenation in the presence of a catalyst. In hydrogenations of somewhat similar products and in reduction of such ketones by other than catalytic hydrogenation, results have been such as to indicate that a carbinol would be formed. However, various of these catechol alkyl ketones have been reduced directly from the ketone to the corresponding alkyl catechol, and it appears that this is a general reaction. If the hydrogenation is stopped when the amount of hydrogen required to form the carbinol has been passed into the solution, it is found that substantially half of the solution is the ketone and the other half is the alkyl catechol. In other words, the reaction appears to go directly from the ketone to the hydrocarbon. The reaction is carried out by dissolving the ketone in absolute alcohol and the introducing hydrogen in the presence of a palladium catalyst, or other catalyst of the platinum group, supported on a suitable carrier such as charcoal.

The catalyst is composed of palladium supported on charcoal and is prepared by agitating charcoal in an aqueous solution of palladium chloride in an atmosphere of hydrogen in the proportions of about 1 part of palladium chloride to 6 parts of charcoal.

*Example 5.*—10.4 parts of hexanoyl catechol dissolved in 125 parts alcohol, preferably anhydrous, is agitated in an atmosphere of hydrogen and in contact with a catalyst prepared from ½ part palladium chloride and 3 parts charcoal, until absorption of hydrogen substantially ceases, which requires approximately 2–2½ hours. The catalyst is then removed and the alcoholic solution fractionally distilled, the hexyl catechol being collected under reduced pressure.

By the catalytic reduction of the appropriate ketone, various alkyl and isoalkyl catechols can be prepared, e. g. the propyl, butyl, amyl, hexyl, heptyl and octyl catechols, etc., including both normal and iso-compounds. The boiling points and phenol coefficients of some of these new products are given in the following table:

|  | Boiling point | Phenol coefficient |
|---|---|---|
| n-Propyl catechol | 136–139° C. (4–5 mm.) | 9–10 |
| n-Butyl catechol | 143–147° C. (5 mm.) | 29 |
| Iso-amyl catechol | M. P., 56–58° C. | |
| n-Hexyl catechol | 167–169° C. (3–4 mm.) | 129 |
| Iso-hexyl catechol | 161–164° C. (5 mm.) | |
| n-Heptyl catechol | 195–200° C. (12 mm.) | 177 |
| n-Octyl catechol | M. P., 40° C. | |
| n-Amyl catechol | 158–159° C. (7 mm.) | |

The alkyl catechols, particularly the alkyl catechols containing more than three carbon atoms in the side chain, are valuable as antiseptics. They may be incorporated in lotions, salves, ointments, gargles, sprays, etc., in admixture with a variety of other chemicals, including appropriate pharmaceutical preparations.

I claim:

1. The methods of preparing alkyl catechols which comprises demethylating and rearranging guaiacol esters to form catechol alkyl ketones, and then reducing the ketones to alkyl catechols.

2. The method of converting catechol alkyl ketones to alkyl catechols which comprises reducing the ketone in solution in absolute alcohol with hydrogen in the presence of a hydrogenation catalyst.

3. The method of producing alkyl catechols from catechol alkyl ketones which comprises dissolving the ketone in absolute alcohol and reducing with hydrogen in the presence of a catalyst which comprises a deposit of palladium on charcoal.

4. The method of producing alkyl catechols which comprises rearranging and demethylating guaiacol esters in solution in the presence of aluminum chloride by heating and decomposing with hydrochloric acid, recovering the ketone thus formed in a purified state, and reducing to the alkyl catechol with hydrogen in solution in an inert solvent in the presence of a hydrogenation catalyst.

5. The method of preparing alkyl catechols which comprises rearranging mono- and di-esters of catechol in solution in the presence of aluminum chloride by heating and decomposing with hydrochloric acid, recovering the ketone thus formed in a purified state, and reducing to the alkyl catechol with hydrogen in solution in an inert solvent in the presence of a hydrogenation catalyst.

6. The method of producing alkyl catechols which comprises heating a compound of the class consisting of guaiacol esters and catechol esters in solution in the presence of aluminum chloride, decomposing with hydrochloric acid, recovering the ketone thus formed and reducing to the alkyl catechol with hydrogen in an inert solvent in the presence of a hydrogenation catalyst.

WALTER H. HARTUNG.